United States Patent
Veerman et al.

(10) Patent No.: US 9,547,895 B2
(45) Date of Patent: Jan. 17, 2017

(54) MEDICAL IMAGE PROCESSING SYSTEM AND METHOD

(75) Inventors: Jan Augustinus Cornelis Veerman, Veldhoven (NL); Radu Serban Jasinschi, Nuenen (NL); Octavian Soldea, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 290 days.

(21) Appl. No.: 14/113,733

(22) PCT Filed: Apr. 17, 2012

(86) PCT No.: PCT/IB2012/051917
§ 371 (c)(1),
(2), (4) Date: Oct. 24, 2013

(87) PCT Pub. No.: WO2012/147011
PCT Pub. Date: Nov. 1, 2012

(65) Prior Publication Data
US 2014/0044329 A1 Feb. 13, 2014

(30) Foreign Application Priority Data
Apr. 28, 2011 (EP) .................................. 11164082

(51) Int. Cl.
*G06T 7/00* (2006.01)
(52) U.S. Cl.
CPC ........... *G06T 7/0012* (2013.01); *G06T 7/0024* (2013.01)
(58) Field of Classification Search
None
See application file for complete search history.

(56) References Cited

U.S. PATENT DOCUMENTS

| 5,542,003 A * | 7/1996 | Wofford ................... G06T 5/40 345/660 |
| 6,366,797 B1 | 4/2002 | Fisher et al. |

(Continued)

FOREIGN PATENT DOCUMENTS

| JP | 2006141534 A | 6/2006 |
| JP | 2010279601 A | 12/2010 |

OTHER PUBLICATIONS

Cuadra, et al. "Dense deformation field estimation for atlas-based segmentation of pathological MR brain images" Computer Methods and Programs in Biomedicine 8 4 ( 2 0 0 6) 66-75 (pp. 1-10).*

(Continued)

*Primary Examiner* — Chan Park
*Assistant Examiner* — Mia M Thomas

(57) ABSTRACT

A system 100 for processing medical images, the system being arranged for obtaining a first medical image 102 and a second medical image 104, the first medical image and the second medical image being rigidly registered medical images of an anatomical structure, and the system comprising a displacement estimator 120 for establishing displacement vectors 122 for at least a first portion of the first medical image, the displacement vectors matching the first portion of the first medical image to a second portion of the second medical image, a deformation estimator 140 for, in dependence on the displacement vectors, establishing deformation values 142 for the first portion, the deformation values representing a deformation of the first portion with respect to the second portion, and a visualization generator 160 for generating visualization data 162 for, when being displayed on a display 180, establishing a multi-dimensional graph 182 comprising magnitudes of the displacement vectors as first variables 184 and the deformation values as second variables 186.

17 Claims, 5 Drawing Sheets

(56) References Cited

U.S. PATENT DOCUMENTS

| | | | | |
|---|---|---|---|---|
| 7,778,488 | B2* | 8/2010 | Nord | G06T 7/0028 382/128 |
| 7,792,343 | B2 | 9/2010 | Pekar | |
| 8,723,953 | B2* | 5/2014 | Klomp | G01C 11/025 348/144 |
| 8,768,018 | B2* | 7/2014 | Ishikawa | G06T 3/0093 382/128 |
| 9,053,534 | B2* | 6/2015 | Ross | G06T 7/0012 |
| 2001/0046320 | A1* | 11/2001 | Nenonen | G06T 5/004 382/169 |
| 2003/0228070 | A1* | 12/2003 | Miki | G06K 9/32 382/289 |
| 2005/0004617 | A1* | 1/2005 | Dawant | A61B 19/20 607/45 |
| 2006/0222225 | A1* | 10/2006 | Kurahashi | G06F 19/321 382/128 |
| 2006/0239530 | A1 | 10/2006 | Oosawa | |
| 2007/0053560 | A1* | 3/2007 | Miller | G06T 7/0012 382/128 |
| 2007/0219651 | A1* | 9/2007 | Kawakami | G06F 3/038 700/83 |
| 2007/0260137 | A1* | 11/2007 | Sato | G06T 5/50 600/407 |
| 2008/0015428 | A1* | 1/2008 | Epstein | G06T 7/2006 600/410 |
| 2008/0080788 | A1* | 4/2008 | Nord | G06T 3/0081 382/294 |
| 2008/0123924 | A1* | 5/2008 | Nabatame | G06T 7/0012 382/131 |
| 2008/0137938 | A1* | 6/2008 | Zahniser | G02B 21/244 382/133 |
| 2008/0219530 | A1* | 9/2008 | Levanon | A61B 5/02007 382/130 |
| 2008/0232714 | A1* | 9/2008 | Nord | G06T 7/0028 382/284 |
| 2008/0247622 | A1* | 10/2008 | Aylward | A61B 90/36 382/131 |
| 2008/0297519 | A1* | 12/2008 | Scapel | G06T 13/40 345/474 |
| 2008/0309783 | A1* | 12/2008 | Nozaki | G06T 5/006 348/222.1 |
| 2008/0310694 | A1* | 12/2008 | Nozaki | G06K 9/6206 382/130 |
| 2008/0317382 | A1 | 12/2008 | Franz et al. | |
| 2009/0030332 | A1* | 1/2009 | Schecter | A61B 5/0031 600/508 |
| 2009/0149741 | A1* | 6/2009 | Heigl | A61B 6/527 600/424 |
| 2009/0208071 | A1* | 8/2009 | Nishimura | A61B 1/041 382/128 |
| 2009/0232378 | A1* | 9/2009 | Nakamura | G06T 7/003 382/131 |
| 2010/0061612 | A1* | 3/2010 | Reisman | G06T 3/0081 382/131 |
| 2010/0158354 | A1* | 6/2010 | Kim | G06T 13/40 382/154 |
| 2010/0183191 | A1* | 7/2010 | Wieneke | G01B 11/16 382/100 |
| 2010/0256494 | A1* | 10/2010 | Azuma | A61B 8/08 600/443 |
| 2010/0284595 | A1 | 11/2010 | Mori et al. | |
| 2010/0303318 | A1 | 12/2010 | Benali et al. | |
| 2011/0081054 | A1* | 4/2011 | Bell | G06T 7/0034 382/128 |
| 2011/0081055 | A1* | 4/2011 | Bell | G06T 7/0034 382/128 |
| 2011/0081061 | A1* | 4/2011 | Bell | G06T 7/0034 382/130 |
| 2011/0090337 | A1* | 4/2011 | Klomp | H04N 7/18 348/144 |
| 2011/0142308 | A1* | 6/2011 | Ishikawa | G06T 3/0093 382/128 |
| 2011/0235884 | A1* | 9/2011 | Schreibmann | G06T 7/0024 382/131 |
| 2012/0019548 | A1* | 1/2012 | Zhu | G06T 11/001 345/589 |
| 2012/0215510 | A1* | 8/2012 | Metaxas | G06T 17/205 703/9 |
| 2012/0288173 | A1* | 11/2012 | Rai | G06T 7/2033 382/131 |
| 2013/0004043 | A1* | 1/2013 | Ross | G06T 7/0016 382/131 |
| 2013/0004044 | A1* | 1/2013 | Ross | G06T 7/0016 382/131 |
| 2013/0308849 | A1* | 11/2013 | Fei | G06T 7/0081 382/131 |
| 2013/0315448 | A1* | 11/2013 | Fletcher | G06T 7/2033 382/107 |
| 2015/0110380 | A1* | 4/2015 | Kobayashi | G06T 7/0028 382/132 |

OTHER PUBLICATIONS

Janke, Andrew L. et al "4D Deformation Modeling of Cortical Disease Progression in Alzheimer's Dementia", Magnetic Resonance in Medicine, vol. 46, No. 4, 2001, pp. 661-666.

Hartkens, T. et al "Measurement and Analysis of Brain Deformation during Neurosurgery", IEEE Transactions on Medical Imaging, vol. 22, No. 1, Jan. 2003.

Chiang, Ming-Chang et al "3D Pattern of Brain Atrophy in HIV/AIDS Visualized using Tensor-Based Morphometry", Neuroimage, vol. 34, 2007, pp. 44-60.

Clatz, Olivier et al "Robust Nonrigid Registration to Capture Brain Shift From Intraoperative MRI", IEEE Transactions on Medical Imaging, vol. 24, No. 11, Nov. 2005, pp. 1417-1427.

Pieperhoff, P. et al "Detection of Structural Changes of the Human Brain in Longitudinally Acquired MR Images by Deformation Field Morphometry: Methodological Analysis, Validation and Application", Neuroimage, vol. 43, 2008, pp. 269-287.

Thompson, P.M. et al, "Computational anatomical methods as applied to aging and dementia", The British Journal of Radiology, vol. 80 (2007), pp. 78-91.

Christensen, Gary E. et al "Deformable Templates using large Deformation Kinematics", IEEE Transaction on Image Processing, vol. 5, No. 10, Oct. 1996, pp. 1435-1447.

Jack, Clifford R. et al "The Alzheimer's Disease Neuroimaging Initiative (ADNI): MRI Methods", Journal of Magnetic Resonance Images, vol. 27, 2008, pp. 685-691.

Grenander, Ulf et al "Computational Anatomy: An Emerging Discipline", Quart. Appl. Math., vol. 56, Jun. 1998, pp. 617-694.

Miller, Michael I. et al "Collaborative Computational Anatomy: An MRI Morphometry Study of the Human Brain via Diffeomorphic Metric Mapping", Num Brain Mapp, vol. 30, No. 7, 2009, pp. 2132-2141.

Konold, Clifford "Alternatives to Scatterplots", ICOTS6, 2002.

Grinstein et al "High Dimensional Visualizations" 7th Data Mining Conference KDD 2001: San Francosco, CA Jan. 2001.

* cited by examiner

MEDICAL IMAGE PROCESSING SYSTEM AND METHOD

CROSS-REFERENCE TO PRIOR APPLICATIONS

This application is the U.S. National Phase application under 35 U.S.C. §371 of International Application No. PCT/IB2012/051917, filed on Apr. 17, 2012, which claims the benefit of European Patent Application No. 11164082.7, filed on Apr. 28, 2011. These applications are hereby incorporated by reference herein.

FIELD OF THE INVENTION

The invention relates to a system for, and a method of processing medical images. The invention further relates to a workstation or imaging apparatus comprising the system, and a computer program product for performing the method.

In the field of medical imaging, it is common for clinicians to compare two different medical images of a same anatomical structure. For example, a first medical image may be a Magnetic Resonance Imaging (MRI) image of a brain of a patient at a first point in time, a second medical image may be a MRI image of the brain of the patient at a later point in time, and the clinician may compare both medical images to determine, e.g., an appearance of a malignant growth or an occurrence of atrophy. In another example, the first medical image may be a reference image comprising a reference anatomical structure, the second medical image may be a patient image comprising an anatomical structure of the patient, and the clinician may compare both medical images to determine, e.g., a deviation of the patient's anatomical structure with respect to the reference anatomical structure.

When comparing both medical images, the clinician may pay particular attention to portions of the second medical image that have been deformed with respect to the first medical image, or vice versa. This may allow the clinician to visually obtain information pertaining, e.g., a health of the patient or an efficacy of a medical treatment.

BACKGROUND OF THE INVENTION

It may be difficult for the clinician to intuitively determine a deformation of a portion of an anatomical structure by visually comparing two different medical images.

A publication "Computational anatomical methods as applied to ageing and dementia" by P. M. Thompson et al., published in The British Journal of Radiology, volume 80, 2007, pp. 78-91, describes tensor-based morphometry, which is said to be able to track volumetric changes throughout a brain of a patient. If a pair of scans is collected from the same subject over time, they can be aligned with each other, using a fluid transformation that applies compressions and expansions at a local level throughout the anatomy. So long as the matching is accurate, the spatial gradient of the transformation, which takes the form of a deformed grid, measures how much tissue is lost over the time interval between the scans. The deformed grid can be plotted and colour-coded. Applied to a sequence of scans acquired over time from the same patient, these deformed grids or voxel compression maps, also known as Jacobian maps, can reveal the extent and spread of atrophy.

Said tensor-based morphometry thus allows a clinician to obtain a plotted and colour-coded visualization of deformed portions of the brain of the patient.

SUMMARY OF THE INVENTION

A problem of said tensor-based morphometry is that the deformed grid is insufficiently suitable for allowing a clinician to accurately interpret deformations of a portion of an anatomical structure of a patient.

It would be advantageous to have a system or method for allowing a clinician to more accurately interpret deformations of a portion of an anatomical structure of a patient.

To address this concern, a first aspect of the invention provides a system for processing medical images, the system being arranged for obtaining a first medical image and a second medical image, the first medical image and the second medical image being rigidly registered medical images of an anatomical structure, and the system comprising a displacement estimator for establishing displacement vectors for at least a first portion of the first medical image, the displacement vectors matching the first portion of the first medical image to a second portion of the second medical image, a deformation estimator for, in dependence on the displacement vectors, establishing deformation values for the first portion, the deformation values representing a deformation of the first portion with respect to the second portion, and a visualization generator for generating visualization data for, when being displayed on a display, establishing a multi-dimensional graph comprising magnitudes of the displacement vectors as first variables and the deformation values as second variables.

In a further aspect of the invention, a workstation or imaging apparatus comprises the system set forth.

In a further aspect of the invention, a method of processing medical images is provided, the method comprising obtaining a first medical image and a second medical image, the first medical image and the second medical image being rigidly registered medical images of an anatomical structure, establishing displacement vectors for at least a first portion of the first medical image, the displacement vectors matching the first portion of the first medical image to a second portion of the second medical image, establishing, in dependence on the displacement vectors, deformation values for the first portion, the deformation values representing a deformation of the first portion with respect to the second portion, and generating visualization data for, when being displayed on a display, establishing a multi-dimensional graph comprising magnitudes of the displacement vectors as first variables and the expansion values as second variables.

In a further aspect of the invention, computer program product is provided comprising instructions for causing a processor system to perform the method set forth.

The system obtains a first medical image and a second medical image that both comprise a certain anatomical structure. In order to spatially align the anatomical structure in the first medical image to the anatomical structure in the second medical image, both medical images are mutually registered using a rigid registration technique, i.e., a linear transformation. Rigid registration techniques are known in the field of medical imaging, and used to compensate for global differences in alignment between anatomical structures in medical images which may be caused by, e.g., differences in orientation of the patient with respect to the medical imaging device, differences in medical acquisition parameters, etc. As a consequence, the anatomical structure in the first medical image is at least coarsely aligned with the anatomical structure in the second medical image.

The system comprises a displacement estimator that estimates displacements for a first portion of the first medical image with respect to the second medical image. Thus, the displacement estimator estimates where sub-portions of the first portion of the first medical image are located within the second medical image. As a result, the displacement estimator generates displacement vectors that match the first portion of the first medical image to a second portion of the second medical image.

The system further comprises a deformation estimator that uses the displacement vectors of the first portion to establish deformation values for the first portion. The deformation values are thus derived from the displacement vectors, and effectively constitute an interpretation of the characteristic displacements of the sub-portions of the first portion with respect to the second medical image. For example, when the displacement vectors of the first portion are oriented radially outward from a center of the first portion, the deformation values may indicate an expansion of the first portion with respect to the second medical image, i.e., the second portion may be an expanded version of the first portion.

The system further comprises a visualization generator that processes the displacement vectors and the deformation values in order to generate visualization data. When the visualization data is displayed on a display, the visualization data provides a multi-dimensional graph that visually represents the magnitudes of the displacement vectors, i.e., their lengths, in relation to the deformation values. For visually representing said relation, the magnitudes of the displacement vectors form a set of first variables and the deformation values form a second set of variable within the multi-dimensional graph.

The above measures have the effect that visualization data is provided that, when displayed on a display, establishes a multi-dimensional graph that sets out the displacements of the first portion against the deformations of the first portion, with the displacements being shown in the form of the magnitudes of the displacements. Said magnitudes are of particular importance when characterizing the displacements of the first portion. Thus, a visualization is provided of the magnitudes of the displacements of the first portion, the deformations of the first portion, and their relationship.

The invention is partially based on the recognition that there is an inherent relation between the displacements of a portion and the deformations values of the portion, given that the deformations values are an algorithmic interpretation of the displacement vectors. The algorithmic interpretation may be incorrect at times, or may adhere to a definition of deformation that may not be intuitive to a clinician. By establishing a multi-dimensional graph that visualizes the magnitudes of the displacements of the portion, the deformations of the portion, and their relationship, the system may visually relate the deformations against the magnitudes of the displacements, thereby allowing the clinician to more accurately interpret the deformations of the portion of the anatomical structure of the patient.

Moreover, the rigid registration of the anatomical structure in the first medical image and the second medical image may be imperfect. A reason for this may be that deformations of the anatomical structure may disturb the rigid registration technique. Advantageously, the clinician may be provided with visual feedback that the medical images are imperfectly rigidly registered by visually relating, from the multi-dimensional graph, the deformations against the magnitudes of the displacements. Advantageously, it may be avoided that the clinician draws erroneous conclusions from observing the medical images.

Furthermore, the multi-dimensional graph visualizes the magnitudes of the displacements of the portion, the deformations of the portion, and their relationship in separation of the actual image data of the portion and in separation of the spatial location within the portion. Thus, the anatomical structure itself is not shown, but advantageously only displacements and deformations within the portion are displayed in a single multi-dimensional graph. Advantageously, it is avoided that the clinician is provided with an overload of visual information.

Optionally, the first medical image and the second medical image are three-dimensional [3D] medical images, the displacement vectors are 3D displacement vectors, and the multi-dimensional graph is a two-dimensional [2D] graph.

The first medical image and the second medical image are 3D medical images, such as volumetric images. As such, the displacements of the first portion of the first medical image may be displacements in three dimensions, i.e., 3D displacements. For representing the 3D displacements, the displacement vectors are 3D displacement vectors, i.e., comprise an x-component, y-component and z-component. However, by visualizing the magnitudes of the displacement vectors, the dimensionality of the displacements is reduced from three to one, i.e., the 3D displacements are shown as scalars. Moreover, the deformation values are scalars. By specifically showing both series of scalars in a 2D graph, an easy to interpret visualization is provided to the clinician. Advantageously, a 2D graph may be less confusing than a 3D graph, leading to a more accurate and less error-prone interpretations of the clinician.

Optionally, the 2D graph is a 2D scatter plot. A 2D scatter plot is well suited for visualizing a relationship between the magnitudes of the displacements of the first portion and the deformations of the first portion. Advantageously, a clinician may visually obtain relevant information from a global outline of the scatter plot.

Optionally, the visualization generator is arranged for generating further visualization data for, when being displayed on the display, establishing a further 2D graph comprising inclination angles of the displacement vectors as first variables and azimuth angles of the displacement vectors as second variables.

The displacement vectors are 3D displacement vectors, i.e., comprise an x-component, y-component and z-component. The 2D graph visualizes one aspect of the 3D displacement vectors, i.e., their magnitudes. However, the directions of the displacement vectors are of relevance as well. The direction of the displacement vectors may be expressed in terms of inclination angles and azimuth angles, yielding a direction in 3D space with respect to the origins of the displacement vectors. By establishing a further 2D graph comprising inclination angles of the displacement vectors as first variables and azimuth angles of the displacement vectors as second variables, the inclination angles, the azimuth angles and their relationship are visualized to the clinician. Advantageously, the clinician may more accurately interpret the displacements of the first portion of the first medical image, allowing in turn for a more accurate interpretation of its deformations.

Optionally, the deformation values represent an expansion and/or a contraction of the first portion with respect to the second portion. The expansion and/or contraction of the first portion are of particular relevance for interpreting its deformation. Moreover, the expansion and/or contraction may be of particular medical relevance, allowing a clinician to visually obtain information pertaining, e.g., an occurrence of atrophy in a portion of a brain of the patient. Certain characteristics of atrophy may relate to an occurrence of Alzheimer's disease. Advantageously, the visualization data may enable a clinician to better diagnose Alzheimer's disease.

Optionally, the deformation estimator is arranged for establishing the deformation values by applying a differentiation-based function to the displacement vectors. Differentiation-based functions are well-suited for establishing the deformations values from displacement vectors, since deformations relate to local differences amongst the displacement vectors in the first portion. Differentiation-based functions provide a measure of how the displacement vectors change with respect to a place in the first portion. Thus, by applying a differentiation-based function to the displacement vectors, a measure of said local differences is obtained.

Optionally, applying the differentiation-based function comprises (i) calculating, in dependence on the displacement vectors, a Jacobian matrix, and (ii) calculating a determinant of the Jacobian matrix. The determinant of the Jacobian matrix is well suited for establishing the deformations values from displacement vectors. In particular, the inventors have recognized that deformation values obtained from the above calculating of the determinant of the Jacobian provide a multi-dimensional graph that is well suited for serving as an indicator for Alzheimer's disease.

Optionally, the displacement estimator is arranged for establishing the displacement vectors using an elastic registration technique. Since the first medical image and the second medical image are rigidly registered medical images of an anatomical structure, the displacements of the first portion relate to local displacements and not, or to a lesser extent, to global displacements. Elastic registration techniques are well suited for obtaining said local displacements from rigidly registered medical images.

Optionally, the system further comprises a user input for enabling a user to select the first portion of the first medical image. The user input enables a user, e.g., a clinician, to select the first portion of the first medical image for obtaining a multi-dimensional graph visualizing specifically the displacements and deformations of the first portion of the first medical image. Advantageously, the clinician may specifically select a medically relevant or medically suspect portion of the first medical image.

Optionally, the system is arranged for obtaining a third medical image, and the system further comprises an image interpolator for (i) generating an interpolated medical image in dependence on the first medical image and the third medical image, and (ii) establishing the interpolated medical image as the second medical image.

By using as the second medical image an interpolated medical image, the displacements and deformations of the first portion are obtained with respect to the interpolated medical image. The interpolated medical image may resemble the first medical image more than the third medical image. For example, when the first medical image is from a first point in time and the third medical image is from a later point in time, the interpolated medical image may correspond to an intermediate point in time. As such, by using the interpolated medical image instead of the third medical image, a finer granularity is obtained in the displacements and deformations of the first portion. Advantageously, the clinician may more accurately interpret the deformations of the first portion of the first medical image. Advantageously, by generating an interpolated medical image for intermediate points in time, the clinician may visually obtain information pertaining a progress or spread of the deformations.

Optionally, the visualization generator is further arranged for generating the visualization data for, when being displayed on the display, establishing a first histogram of the magnitudes of the displacement vectors and/or a second histogram of the deformation values.

By additionally showing the first histogram and/or the second histogram, the clinician is provided with additional information pertaining the displacements of the first portion and/or the deformations of the first portion. Advantageously, the clinician may more accurately interpret the deformations of the first portion.

It will be appreciated by those skilled in the art that two or more of the above-mentioned options, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g. to two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). A dimension of the multi-dimensional image data may relate to time. For example, a three-dimensional image may comprise a time domain series of two-dimensional images.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
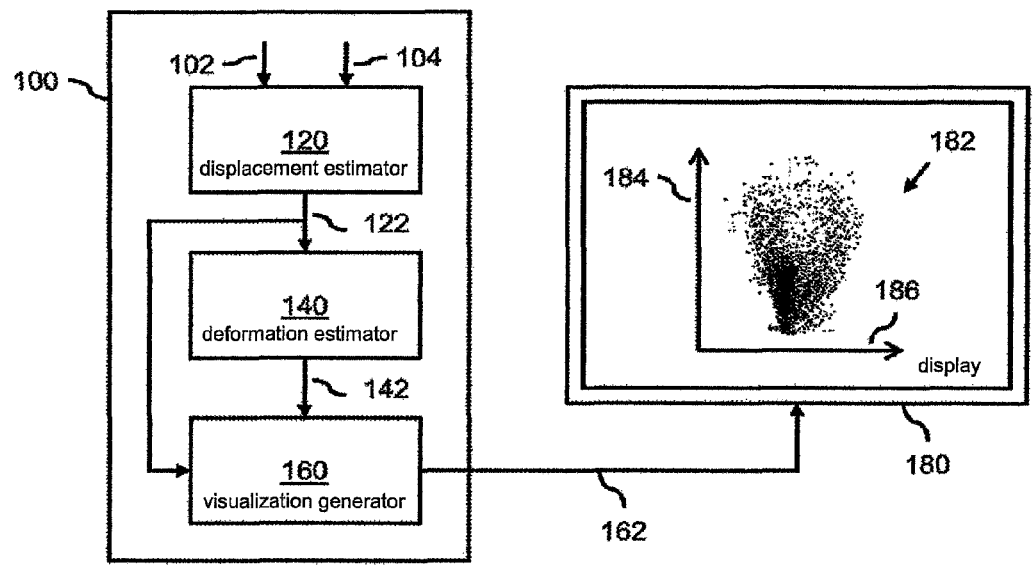
FIG. 1 shows a system for generating visualization data and a display displaying a multi-dimensional graph in dependence on the visualization data.

FIG. 1 shows a system 100 for processing medical images. The system 100 is arranged for obtaining a first medical image 102 and a second medical image 104. Said obtaining may comprising receiving the first medical image 102 and/or the second medical image 104 from an input of the system 100. The first medical image 102 and the second medical image 104 are rigidly registered medical images of an anatomical structure. The anatomical structure may be, e.g., an organ or blood vessel arrangement of a patient.

The first medical image 102 and the second medical image 104 may be, e.g., two-dimensional images or three-dimensional images. The three-dimensional images may be volumetric images. The medical images may have been obtained through, e.g., MRI, X-ray Imaging, Computed Tomography (CT), or any other suitable acquisition modality.

Figure 3:
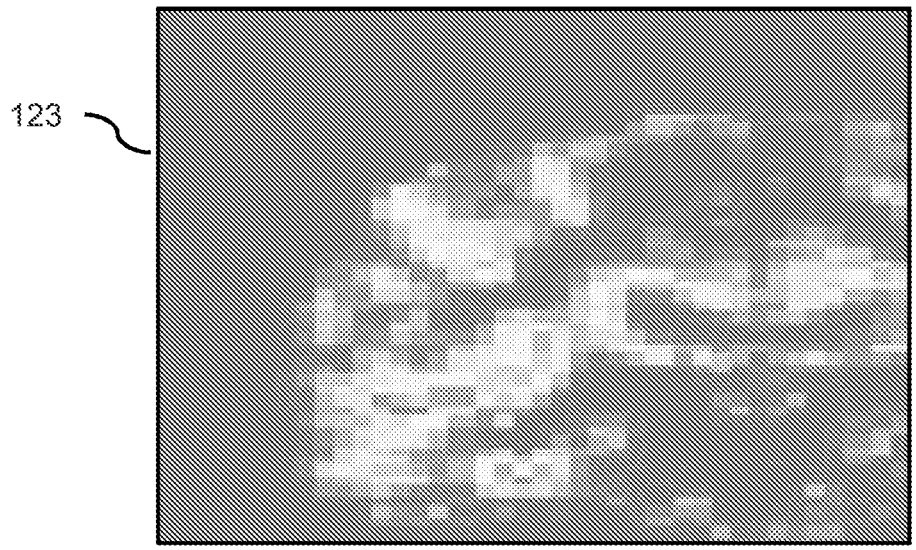
FIG. 3 shows magnitudes of displacement vectors for a portion of a brain.

The system 100 comprises a displacement estimator 120 for establishing displacement vectors 122 for at least a first portion of the first medical image 102. The first portion may be, e.g., a rectangular portion when the first medical image 102 is a two-dimensional image. It will be appreciated, however, that the first portion may take any suitable shape within the first medical image 102, and that its dimensionality is typically related to, or corresponds to the dimensionality of the first medical image 102. The displacement estimator 120 establishes the displacement vectors 122 for the first portion, resulting in the displacement vectors 122 matching the first portion of the first medical image 102 to a second portion of the second medical image 104. An example of displacement vectors 122 for the first portion are shown in FIG. 3 in the form of the magnitudes 123 of the displacement vectors, i.e., their Euclidian length. Here, the first portion is a portion of a brain, and the magnitudes 123 of the displacement vectors are shown as grey-value image data, with an intensity representing a size of the magnitudes 123 of the displacement vectors.

Figure 4:
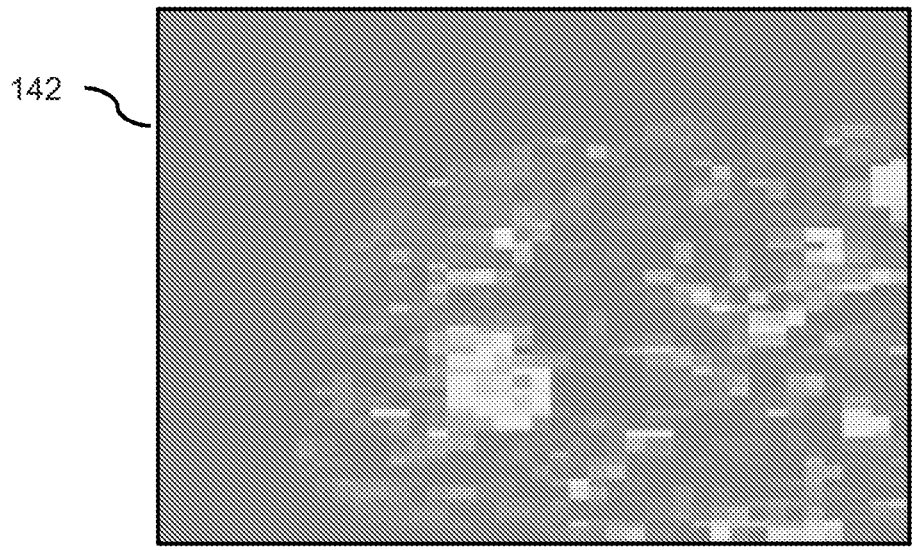
FIG. 4 shows deformation values for the portion of the brain.

The system 100 comprises a deformation estimator 140 for, in dependence on the displacement vectors 122, establishing deformation values 142 for the first portion. For that purpose, the deformation estimator 140 is shown to be connected to the displacement estimator 120 for receiving the displacement vectors 122. The deformation values 142 represent a deformation of the first portion with respect to the second portion, and as such, may indicate, e.g., a magnitude of deformation, a type of deformation, etc. An example of deformation values 142 is shown in FIG. 4. Here, the deformation values 142 are shown as grey-value image data, with an intensity representing an amount of deformation.

The system 100 further comprises a visualization generator 160 for generating visualization data 162 for, when being displayed on a display 180, establishing a multi-dimensional graph 182 comprising magnitudes of the displacement vectors 122 as first variables 184 and the deformation values 142 as second variables 186. For that purpose, the visualization generator 160 is shown to be connected to the displacement estimator 120 for receiving the displacement vectors 122, and to the deformation estimator 140 for receiving the deformation values 142. Moreover, the system 100 is shown to be connected to the display 180 for providing the visualization data 162 to the display 180. The visualization data 162 may have any suitable format, e.g., being binary data comprising directly a data representation of the multi-dimensional graph 182, or comprising the magnitudes of the displacement vectors 122 and the deformation values 142 in a suitably formatted form for enabling display of said values in the multi-dimensional graph.

The multi-dimensional graph 182 is shown in FIG. 1 to be a two-dimensional scatter plot 182. In this scatter plot 182, the deformation values 142 are set out against the magnitudes of the displacement vectors 122 by plotting points having the deformation values 142 as a first coordinate and the magnitudes of the displacement vectors 122 as a second coordinate. As a consequence, the x-axis 186 of the scatter plot 182 represents the deformation values 142, and the y-axis 184 of the scatter plot 182 represents the magnitudes of the displacement vectors 122. The scatter plot 182 may therefore be understood as comprising, and visualizing, the deformation values 142 as independent first variables, and the magnitudes of the displacement vectors 122 as thereon dependent second variables.

It will be appreciated that the multi-dimensional graph may be any other suitable graph that allows the deformation values 142 to be set out against the magnitudes of the displacement vectors 122, i.e., their relation to be visualized. In this respect, the term graph is understood as referring to an abstract representation of the first variables and the second variables, and thus being provided in separation of the medical images. For example, any of the plotting techniques described in the publication "*Alternatives to scatterplots*" by Clifford Konold et al., ICOTS6, 2002, may be used. The multi-dimensional graph may also be a three-dimensional graph, with, e.g., the z-axis of the three-dimensional graph representing another series of values. The display 180 may be a three-dimensional display for directly showing the three-dimensional graph, or a two-dimensional display for showing a two-dimensional representation of the three-dimensional graph.

Figure 5:
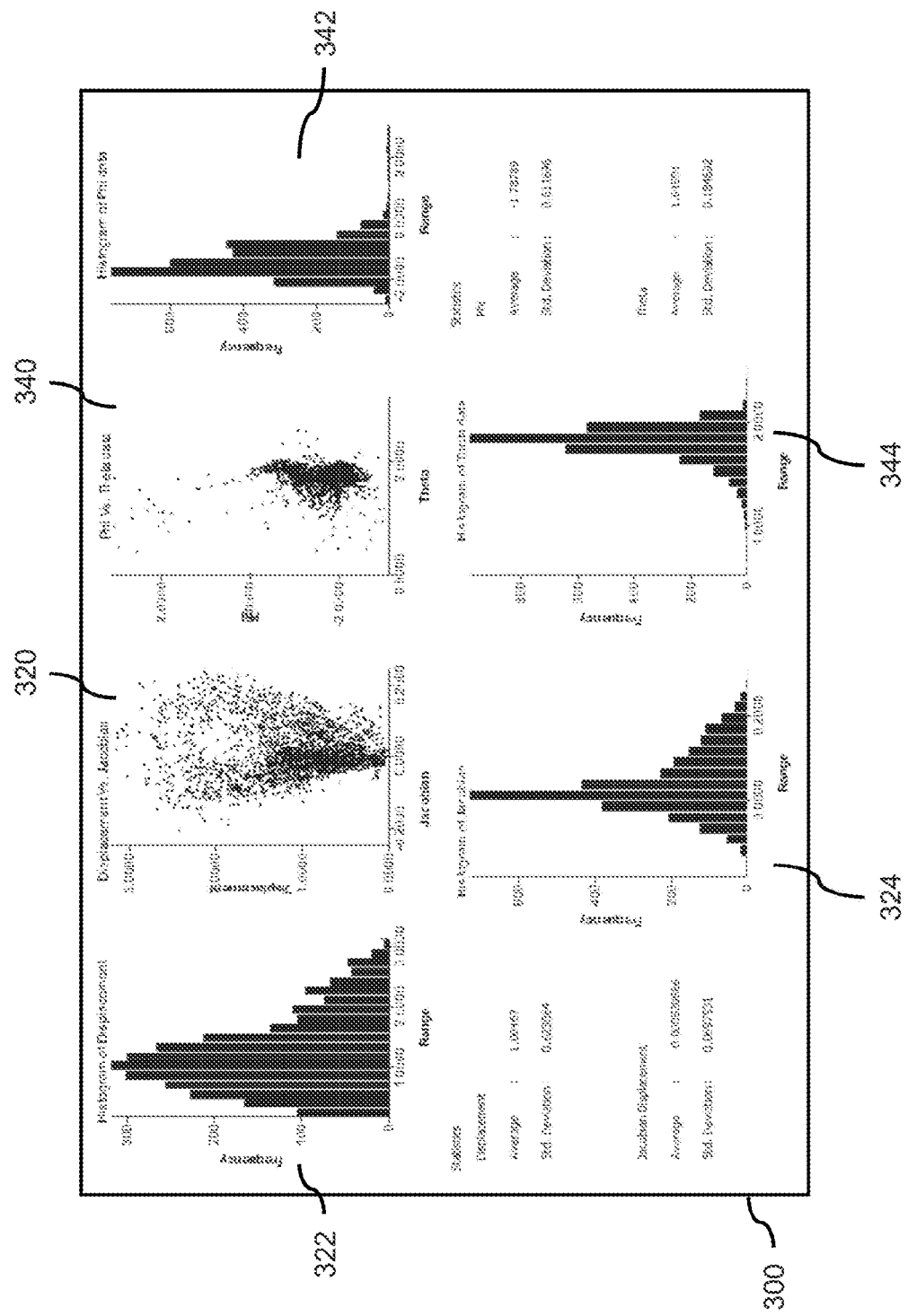
FIG. 5 shows a user interface comprising the multi-dimensional graph.

FIG. 5 shows an example of a user interface 300 that may be established on the display 180 by the system 100. The user interface 300 may be established by the visualization data 162 generated by the visualization generator 160. It will be appreciated that the user interface 300 may allow a user to provide input to the system 100. However, the user interface 300 may also, or exclusively, be used by the system 100 for providing system output to the user. The user interface 300 shows a first scatter plot 320 that sets out the deformation values 142 on the x-axis against the magnitudes of the displacement vectors 122 on the y-axis. The visualization data 162 may further establish a first histogram 322 of the magnitudes of the displacement vectors, and a second histogram 324 of the deformation values. These histograms are shown in the user interface 300 to the sides of the first scatter plot 320, with each histogram showing on its x-axis a range and on its y-axis a frequency.

The first medical image 102 and the second medical image 104 may be three-dimensional medical images and the displacement vectors 122 may be three-dimensional displacement vectors. Thus, the displacement vectors 122 may be expressed as a combination of magnitudes, i.e., lengths of the vectors, and angles defined in three-dimensional space. The angles defined in three-dimensional space may be so-termed polar angles comprising, for each vector, a combination of an inclination angle • and an azimuth angle •. Although not shown in FIG. 1, the visualization generator 120 may be arranged for generating further visualization data for, when being displayed on the display 180, establishing a second scatter plot in the user interface for setting out the azimuth angles •, or 'theta', on the x-axis against the inclination angles •, or 'phi', on the y-axis. The user interface 300 of FIG. 5 shows the second scatter plot 340. The further visualization data may further establish a third histogram 342 of the inclination angles, and a fourth histogram 344 of the azimuth angles. These histograms are shown to the sides of the second scatter plot 340, with each histogram showing on its x-axis a range and on its y-axis a frequency.

Figure 6:
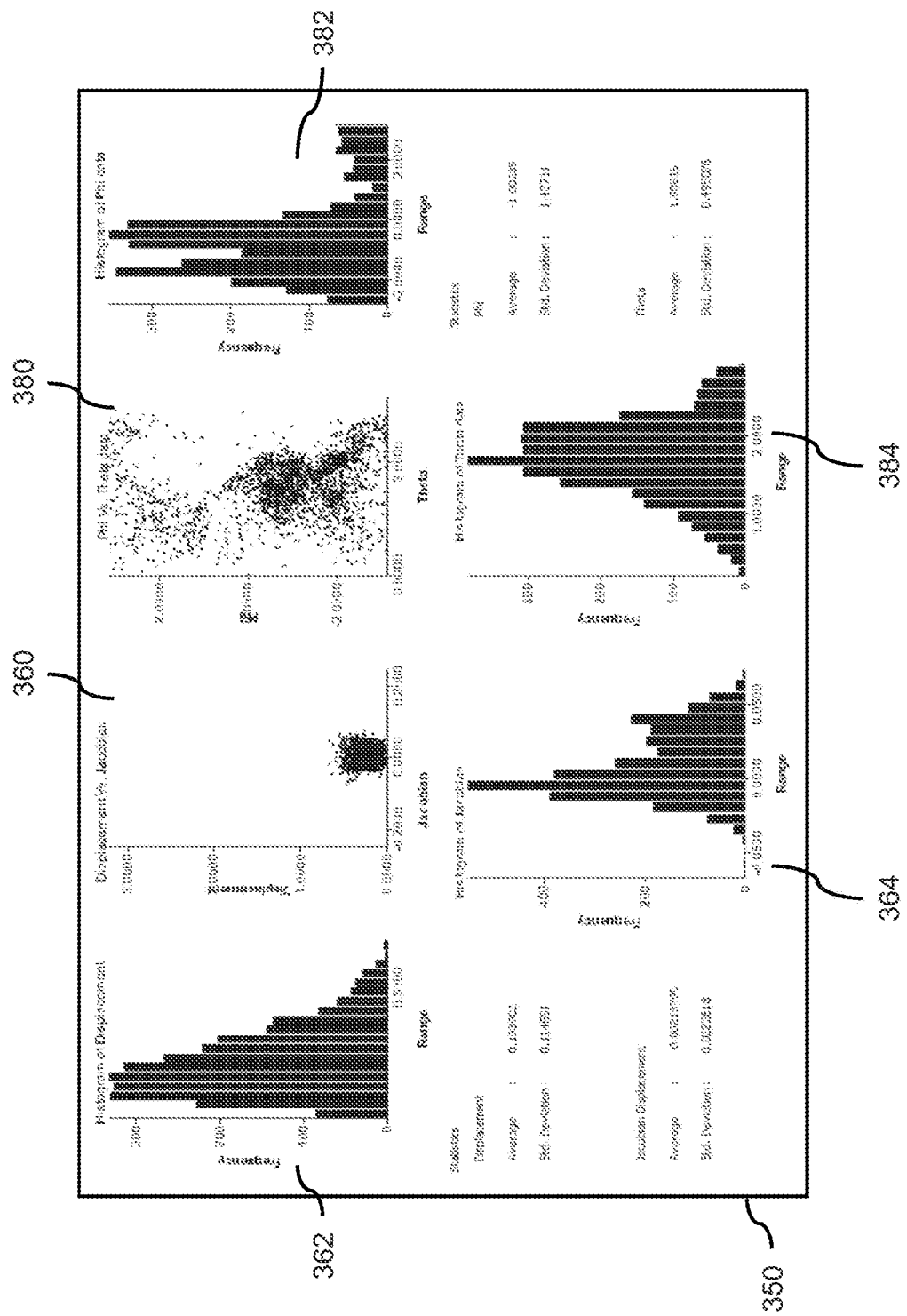
FIG. 6 shows the user interface for another portion of the medical image.

The medical images used in generating the scatter plots and histograms shown in FIG. 5 are three-dimensional MRI images of a brain volume of a patient that has been diagnosed with Alzheimer's disease, with the MRI images corresponding to so-termed 1.5T ADNI T1-weighted MR brain volumes as described in the publication "*The alzheimer's disease neuroimaging initiative*" by Clifford R. Jack et al., J Magn Reson Imaging., vol. 27(4), pp. 685-691, April 2008. FIG. 6 shows a further example of a user interface 400 that may be established on the display 180 by the system 100. The user interface 400 of FIG. 6 is similar to the user interface 300 of FIG. 5, with the exception that the medical images used in generating the scatter plots and histograms shown in FIG. 6 are three-dimensional MRI images of a brain volume of a patient that has been diagnosed with not suffering from Alzheimer's disease. As a consequence, the first scatter plot 360, the second scatter plot 380, the first histogram 362, the second histogram 364, the third histogram 382 and the fourth histogram 384 all differ in appearance from those shown in FIG. 5.

The displacement estimator 120 may be arranged for establishing the displacement vectors 122 by using an elastic registration technique. In particular, the elastic registration technique may be a fluid-flow model based template matching technique. An example of such a technique is described in the publication "*Deformable templates using large deformation kinematics*" by G. E. Christensen et al., IEEE Transactions on Image Processing, vol. 5, no. 10, pp. 1435-1447, October 1996.

In this technique, in order to match a baseline image, e.g., the first medical image 102, to a follow-up image, e.g., the second medical image 104, a pixel x•u in the template is moved to a pixel x in the study through the three-dimensional displacement vector u. The displacement vector u may be computed by solving the following equation:

$$v = \frac{du}{dt} = \frac{\partial u}{\partial t} + \sum_{i=1}^{3} v_i \frac{\partial u}{\partial x_i} \quad (1)$$

Here, t parameterizes the path that is traced out by individual pixels as they "deform" from the baseline image position to that of the follow-up image. The velocity v may be calculated through a so-termed modified Navier-Stokes equation:

$$\mu \nabla^2 v + (\lambda+\mu)\nabla(\nabla \cdot v) + b(u) = 0 \quad (2)$$

where • and • are constants, and b is the "body force", which drives the deformation and is defined by:

$$b = [x, u(x,t)] = -\alpha(T[x-u(x,t)] - S(x))\Delta T|_{x-u(x,t)} \quad (3)$$

Here, T and S are the intensities of the (deformed) baseline and the follow-up images, respectively. The above equations (1), (2), and (3) may be discretized and solved iteratively, e.g., using a so-termed Successive Over Relaxation (SOR) method as known from the field of numerical linear algebra. It will be appreciated, however, that any suitable technique for establishing the displacement vectors may be used as well, as are known from the fields of image registration, optical flow, and motion estimation.

Moreover, the visualization generator 160 may be arranged for establishing the azimuth angles • and the inclination angles • by solving the following equation:

$$u_x = |u|\sin\theta\cos\phi \quad (4)$$

$$u_y = |u|\sin\theta\sin\phi$$

$$u_z = |u|\cos\theta$$

with $0 \le \theta < \pi$ and $-\pi \le \phi < \pi$. It will be appreciated that said equations may also be solved by the displacement estimator 120 or an intermediate component. Similarly, the magnitudes of the displacement vectors 122, i.e., their lengths, may be determined by the displacement estimator 120 or said intermediate component.

The deformation estimator 140 may be arranged for establishing the deformation values 142 by calculating a so-termed determinant of the Jacobian, J, which indicates whether the first portion is contracting (J<1), or expanding (J>1) and also indicates the rate at which this happens. The Jacobian may be calculated as the spatial derivatives of the displacement vector u, summed with the unity matrix:

$$J = \det \begin{pmatrix} 1 - \frac{\partial u_x}{\partial x} & -\frac{\partial u_x}{\partial y} & -\frac{\partial u_x}{\partial z} \\ -\frac{\partial u_y}{\partial x} & 1 - \frac{\partial u_y}{\partial y} & -\frac{\partial u_y}{\partial z} \\ -\frac{\partial u_z}{\partial x} & -\frac{\partial u_z}{\partial y} & 1 - \frac{\partial u_z}{\partial z} \end{pmatrix} \quad (5)$$

The Jacobian and the determinant of the Jacobian are known from the field of vector calculus, and may be used for calculating the expansion and/or contraction of the first portion with respect to the second portion. It will be appreciated, however, that any suitable technique for establishing the deformation values 142 may be used as well. For example, any other differentiation-based function may be applied to the displacement vectors 122.

Figure 7:
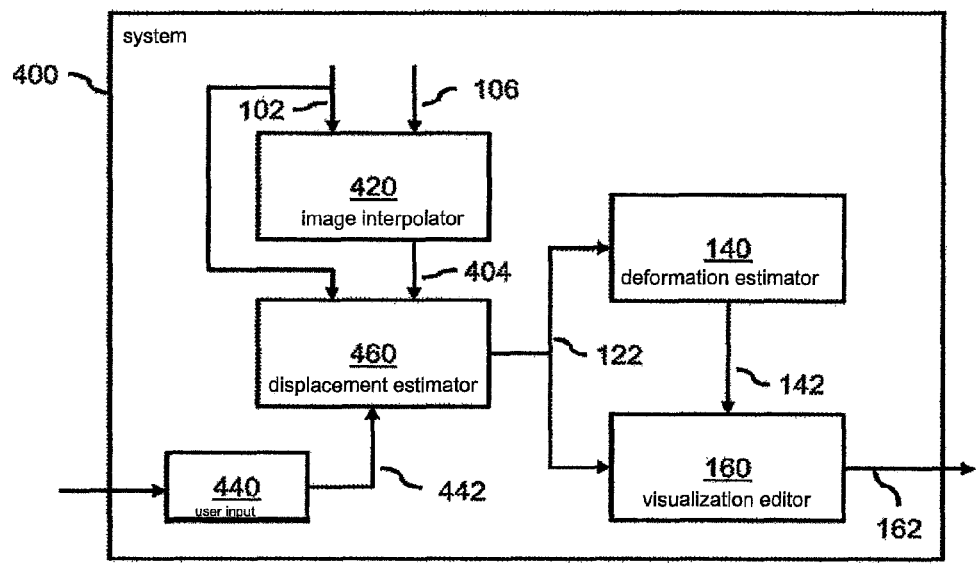
FIG. 7 shows a system for generating visualization data, the system comprising an image interpolator for generating an interpolated medical image and a user input.
Figures 8A, 8B, 8C, 8D:
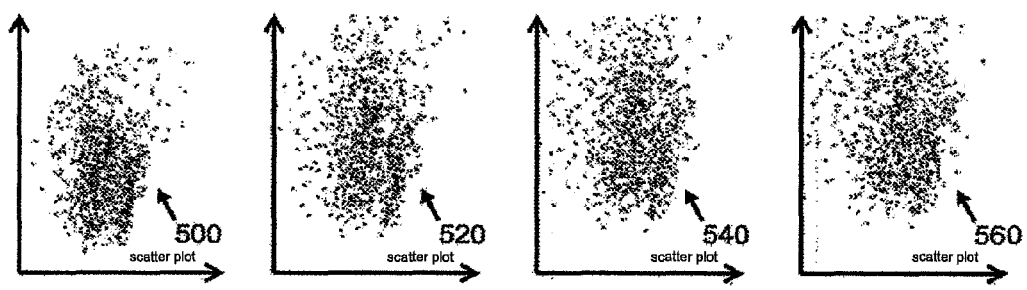
FIGS. 8a-8d show a series of multi-dimensional graphs for a series of interpolated medical images.

FIG. 7 shows a system 400 comprising the deformation estimator 140 and the visualization generator 160 of the system 100 shown in FIG. 1. The system 400 further comprises a user input 440 for enabling a user to select the first portion of the first medical image. The user may select the first portion by operating a computer mouse, keyboard, etc. The user may obtain feedback during the operating of the computer mouse, keyboard, etc, by the system 400 displaying said feedback on a display. The selection command of the user may result in selection data 442 being sent to the displacement estimator 460. For that purpose, the displacement estimator 460 is shown to be connected to the user input 440 for receiving the selection data 442. As such, the user may select, e.g., when the medical images are of a brain volume, the hippocampus or the ventricles in the brain volume. The first portion may be a three-dimensional first portion, e.g. a box-shaped portion. In addition to the user input 440, or alternatively, the system 400 may further comprise a region-of-interest detector for detecting a region of interest in the first medical image. The region-of-interest detector may then establish the region of interest as the first portion.

The system 400 further comprise an image interpolator 420 for generating an interpolated medical image 404 in dependence on the first medical image 102 and a third medical image 106. The third medical image 106 may be obtained by the system by, e.g., receiving the third medical image 160 from an input of the system 400. The interpolated medical image 404 is an intermediate medical image that reflects a state of the anatomical structure in between the first medical image 102 and the third medical image 106. For generating the interpolated medical image 404, the image interpolator 420 may use any suitable technique from the fields of, e.g., temporal image interpolation and image morphing. The image interpolator 420 then establishes the interpolated medical image 404 as the second medical image for further use in the displacement estimator 460.

Although shown as a separate component in FIG. 7, the image interpolator 420 may be part of the displacement estimator 460. In particular, when the displacement estimator 460 employs the aforementioned fluid-flow model based template matching technique of Christensen et al., the functionality of establishing the displacement vectors 122 may allow for the displacement vectors 122 being established for any number of intermediate medical images between the first medical image 102 and the third medical image 106. In particular, in the technique of Christensen et al., the anatomical structure may be deformed between the "baseline" or initial anatomical structure, i.e., the first medical image 102, and "follow-up" or final anatomical structure, i.e., the third medical image 106, in N steps, where each step is described as a point in a trajectory in an internal space. These N steps are intermediate representations of the anatomical structure between the actual medical images and therefore they describe an N-fold increase in information about the anatomical structure.

The system 400 is arranged for establishing the multi-dimensional graph with respect to at least one of the intermediate representations of the anatomical structure. The user input 440 may enable the user to select a specific one of the intermediate representations. The system 400 may also establish the multi-dimensional graph for a subset, or all of the N intermediate representations. Thus, for each of said intermediate representations, the determinant of the Jacobian may be established by the visualization.

FIGS. 8a-8d show examples of two-dimensional scatter plots 500, 520, 540, 560 established for four of the aforementioned intermediate representations. The scatter plots 500, 520, 540, 560 thus correspond to the displacements and deformations of the first portion of the first medical image with respect to each of the intermediate representations. The Figures show a clear difference in outline of the scatter plots, e.g., when comparing the scatter plot 500 of FIG. 8a to the scatter plot 560 of FIG. 8d. This may allow a clinician to visually obtain information pertaining, e.g., an occurrence of atrophy in a portion of a brain of the patient. It will be appreciated that said series of two-dimensional scatter plots 500, 520, 540, 560 may be visualized as a three-dimensional scatter plot, with the x-axis representing the deformation values, the y-axis representing the magnitudes of the displacement vectors, and the z-axis representing a time axis.

Although not shown in FIG. 7, the system 400 may also comprise an image processor for pre-processing any or all of the first medical image 102, the second medical image 104 and the third medical image 106. The image processor may be arranged for said pre-processing by performing any or all of the following steps:
1. Bias field removal for removal of image brightness inhomogeneities due to, e.g., imperfections or inherencies of an MRI scanning device.
2. Rigid registration for aligning the medical images by, e.g., rotation and translation of the medical images.
3. Skull removal for removal of the skull structure which may be present in the medical images, and which may not be relevant for, e.g., determination of atrophy;
4. Linear intensity scaling for scaling the medical images to an equal intensity range; and
5. Histogram equalization for removal of intensity differences between the medical images, which may remain after intensity scaling due occurrence of pixels with a significantly higher or lower intensity value than that of the surrounding tissue.

The image processor and the deformation estimator 122 may also be arranged for jointly iterating the aforementioned rigid registration step and the establishing of the deformation values 122, with the deformation values 122 of a current iteration step being used in the rigid registration of a following iteration step. The iteration may end when the deformation values 122 have converged to a certain state or when a certain match error between the medical images is obtained that is lower than a threshold match error.

Figure 2:
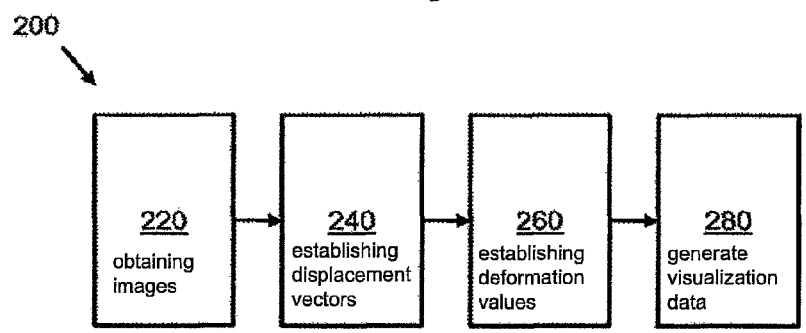
FIG. 2 shows a method of generating visualization data.

FIG. 2 shows a method 200 of processing medical images, the method comprising obtaining 220 a first medical image and a second medical image, the first medical image and the second medical image being rigidly registered medical images of an anatomical structure, establishing 240 displacement vectors for at least a first portion of the first medical image, the displacement vectors matching the first portion of the first medical image to a second portion of the second medical image, establishing 260, in dependence on the displacement vectors, deformation values for the first portion, the deformation values representing a deformation of the first portion with respect to the second portion, and generating 280 visualization data for, when being displayed on a display, establishing a multi-dimensional graph comprising magnitudes of the displacement vectors as first variables and the expansion values as second variables.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system configured to process medical images, the system being configured to obtain a first medical image and a second medical image, the first medical image and the second medical image being rigidly registered medical images of an anatomical structure, and the system comprising:
    a displacement estimator configured to establish displacement vectors for at least a first portion of the first medical image, wherein the first portion has a first dimensionality that corresponds to a second dimensionality of the first medical image, the displacement vectors matching the first portion of the first medical image to a second portion of the second medical image, wherein the first medical image and the second medical image are three-dimensional [3D] medical images, the displacement vectors are 3D displacement vectors;
    a deformation estimator configured to, in dependence on the displacement vectors, establish deformation values for the first portion, the deformation values representing a deformation of the first portion with respect to the second portion; and
    a visualization generator configured to generate visualization data configured to, when being displayed on a display, establish a multi-dimensional graph comprising magnitudes of the displacement vectors as first variables and the deformation values as second variables, wherein the multi-dimensional graph is a two-dimensional [2D] graph and the visualization generator is configured to generate further visualization data configured to, when being displayed on the display, establish a further 2D graph comprising inclination angles of the displacement vectors as first variables and azimuth angles of the displacement vectors as second variables.

2. The system according to claim 1, wherein the 2D graph is a 2D scatter plot.

3. The system according to claim 1, wherein the deformation values represent an expansion and/or a contraction of the first portion with respect to the second portion.

4. The system according to claim 3, wherein the deformation estimator is configured to establish the deformation values by applying a differentiation-based function to the displacement vectors.

5. The system according to claim 4, wherein applying the differentiation-based function comprises (i) calculating, in dependence on the displacement vectors, a Jacobian matrix, and (ii) calculating a determinant of the Jacobian matrix.

6. The system according to claim 1, wherein the displacement estimator is configured to establish the displacement vectors using an elastic registration technique.

7. The system according to claim 1, wherein the system further comprises a user input configured to enable a user to select the first portion of the first medical image.

8. The system according to claim 1, wherein the system is configured to obtain a third medical image, and wherein the system further comprises an image interpolator configured to (i) generate an interpolated medical image in dependence on the first medical image and the third medical image, and (ii) establish the interpolated medical image as the second medical image.

9. The system according to claim 1, wherein the visualization generator is further configured to generate the visualization data for configured to, when being displayed on the display, establish a first histogram of the magnitudes of the displacement vectors and/or a second histogram of the deformation values.

10. A workstation or imaging apparatus comprising the system according to claim 1.

11. A method of processing medical images, the method comprising:
    obtaining a first rigidly registered medical image and a second rigidly registered medical image, the first medical image and the second medical image being rigidly registered medical images of an anatomical structure;
    establishing displacement vectors for at least a first portion of the first medical image, wherein the first portion has a first dimensionality that corresponds to a second dimensionality of the first medical image, the displacement vectors matching the first portion of the first medical image to a second portion of the second medical image;
    establishing, in dependence on the displacement vectors, deformation values for the first portion, the deformation values representing a deformation of the first portion with respect to the second portion; and
    generating visualization data for, when being displayed on a display, establishing a multi-dimensional graph comprising magnitudes of the displacement vectors as first variables and the deformation values as second variables, wherein the visualization generator is configured to generate further visualization data configured to, when being displayed on the display, establish a 2D graph comprising inclination angles of the displacement vectors as first variables and azimuth angles of the displacement vectors as second variables.

12. A non-transitory computer program product comprising instructions for causing a processor system to perform the method according to claim 11.

13. The method according to claim 11, wherein the first medical image and the second medical image are three-dimensional [3D] medical images, the displacement vectors are 3D displacement vectors, and the multi-dimensional graph is a two-dimensional [2D] graph.

14. The method according to claim 11, wherein the deformation values represent an expansion and/or a contraction of the first portion with respect to the second portion.

15. The method according to claim 14, further including:
establishing the deformation values by applying a differentiation-based function to the displacement vectors by (i) calculating, in dependence on the displacement vectors, a Jacobian matrix, and (ii) calculating a determinant of the Jacobian matrix.

16. The method according to claim 11, further including:
establishing the displacement vectors using an elastic registration technique.

17. The method according to claim 11, further including:
obtaining a third medical image;
generating an interpolated medical image in dependence on the first medical image and the third medical image; and
establishing the interpolated medical image as the second medical image.

* * * * *